(12) United States Patent
Rabarts et al.

(10) Patent No.: US 8,950,988 B2
(45) Date of Patent: Feb. 10, 2015

(54) METHOD AND APPARATUS FOR STACKING LOADS IN VEHICLES

(75) Inventors: Graham Bruce Rabarts, Hamilton (NZ); Mark John Holmes, Matamata (NZ)

(73) Assignee: Maxiloda Limited, Hamilton (NZ)

( * ) Notice: Subject to any disclaimer, the term of this patent is extended or adjusted under 35 U.S.C. 154(b) by 283 days.

(21) Appl. No.: 12/744,530

(22) PCT Filed: Nov. 26, 2008
(Under 37 CFR 1.47)

(86) PCT No.: PCT/NZ2008/000317
§ 371 (c)(1),
(2), (4) Date: Oct. 4, 2010

(87) PCT Pub. No.: WO2009/070039
PCT Pub. Date: Jun. 4, 2009

(65) Prior Publication Data
US 2012/0025556 A1    Feb. 2, 2012

(30) Foreign Application Priority Data
Nov. 27, 2007  (NZ) ....................... 563794

(51) Int. Cl.
*B60P 7/08* (2006.01)
*B60P 1/00* (2006.01)
*B65G 67/20* (2006.01)

(52) U.S. Cl.
CPC .. *B60P 1/00* (2013.01); *B65G 67/20* (2013.01)
USPC ................. 410/67; 410/66; 410/89; 410/130; 410/150

(58) Field of Classification Search
CPC ............ B60P 3/08; B60P 7/08; B60P 7/0892; B60P 7/135; B60P 7/15; E04C 3/00
USPC ......... 410/46, 66, 67, 89, 129–139, 143, 150; 105/370, 375; 296/24.4; 248/351
See application file for complete search history.

(56) References Cited

U.S. PATENT DOCUMENTS 1,868,638 A    7/1932   Mackey
2,468,101 A    4/1949   Nampa
(Continued)

FOREIGN PATENT DOCUMENTS

AU    27478    * 10/1994
AU    654053 B    10/1994

OTHER PUBLICATIONS

International Search Report dated May 27, 2009 in corresponding international patent application No. PCT/NZ2008/000317, 4 pages.

*Primary Examiner* — Stephen Gordon
(74) *Attorney, Agent, or Firm* — Greer, Burns & Crain, Ltd.

(57) ABSTRACT

A system for optimizing storage in an enclosed transport trailer (6), having transverse bearing beams (2) for supporting a load such as loaded pallets (12, 13) at a mid height of the trailer such that two storage levels are available. The beams have a wheel (10) at each end that runs in a horizontal track (11) attached to each side wall of the trailer, the track enclosing the wheels to prevent them from disengaging from the track. Adjacent beams can be attached together at variable spacings using a spacer bar (15) to suit a particular pallet or load size. The track has a junction adjacent the open end (20) of the trailer that leads up to another track (18) immediately below the roof line where the beams can be moved to an out of the way storage position (19) when not required.

16 Claims, 7 Drawing Sheets

(56) References Cited

U.S. PATENT DOCUMENTS

| | | |
|---|---|---|
| 3,094,940 A | 6/1963 | Learmont |
| 4,094,546 A | 6/1978 | Glassmeyer et al. |
| 4,642,018 A * | 2/1987 | Leroux et al. |
| 5,228,823 A | 7/1993 | Crook |
| 5,387,064 A * | 2/1995 | Cardinal ............... 410/89 |
| 6,112,915 A | 9/2000 | Lewis |
| 8,172,494 B1 * | 5/2012 | Knox ............... 410/89 |
| 2006/0051178 A1 | 3/2006 | Scott |

* cited by examiner

METHOD AND APPARATUS FOR STACKING LOADS IN VEHICLES

RELATED APPLICATIONS

This application claims priority, under 35 U.S.C. §119, to international patent application No.: PCT/NZ2008/000317, filed on Nov. 26, 2008, which claims priority to New Zealand patent application No.: 563794, filed Nov. 27, 2007, the disclosures of which are incorporated by reference herein in their entireties.

TECHNICAL FIELD

The invention relates to a bearer system for supporting removable loads.

BACKGROUND

The efficient use of space for storage of material is a common problem. In many instances the storage space is enclosed, with access available from one end only. Common examples include the interior of a container as used for shipping or road transport, and the interior of a truck or trailer unit with an enclosed canopy.

Another example is in a warehouse where access to an elongated space may be limited to one end only, typically an aisle.

In such cases the goods to be stored must be loaded and unloaded from one end of the available space, and moved into position inside the space. Given this arrangement, the challenge is to find a way of making efficient use of the available space while maintaining the ability to load and unload efficiently.

Normally loading material onto the floor or base of the available space is relatively straight forward. However in many instances the height to which material can be stored on the floor is considerably less than the height available.

This is illustrated by the common situation where material to be transported is loaded onto pallets. These pallets are produced in a standard form, with typical dimensions of 1 meter by 1.2 meters. The pallet is loaded in such a way as to make a stable load which can be manoeuvred readily by means of a forklift or other mechanical lifting device, such as a pallet mover.

The height of the stored material on the pallet will depend on such things as the shape, size, and weight of the stored material.

In many cases the height of the loaded pallet is less than half the height available inside the storage space. Generally it is not appropriate to stack a second layer of pallets directly on top of the material on the lower pallets.

In order to make use of the available space a further floor or support level is required.

However, a permanent second floor or support level is not appropriate for storage spaces where versatility is required to accommodate variations in the size, and particularly the height, of the material to be stored. It is not uncommon to have a range of goods with different requirements stored in the same storage space. For example a load for a large haulage trailer may have a section of the interior space used for goods which require the full height of the available space and another section for goods where there is room for two layers.

One solution to this problem is to install a removable second floor which can be stored out of the way when not required. Such floors are typically made in sections and stored near the ceiling of the storage space when not in use. When in use a section of the floor is lowered and locked into position to form a platform for further storage.

The use of a removable second floor can be illustrated by considering a truck or trailer unit having an enclosed canopy, termed a pan, fitted with a removable second floor which is located at the top of the pan when not in use. The material to be stored is taken to be in the form of loaded pallets although the same principles apply to other forms of storage.

The first step in loading the pan is to place a first row of pallets on the floor against the rear wall of the pan (ie the wall opposite the open end of the pan).

A first section of the second floor is then lowered and locked into position to form a support platform above the first row of loaded pallets. In this application the sections of the second floor are typically the same width as a pallet.

A forklift or other lifting device is then used to load a row of pallets onto the first section of the second floor.

This process is continued for each subsequent row until all the material is loaded or all the space on the floor of the pan and the second floor has been used.

Unloading is the reverse of this process whereby a forklift is used to remove the pallets from the section of the second floor closest to the open end of the pan. The unloaded section of the second floor is unlocked and moved into an out of use position, typically close to the ceiling. The row of pallets on the floor is then removed to allow access to the pallets on the next section of the second floor. The process is repeated until all pallets have been removed and the second floor stored in an out of use position.

Use of a second floor potentially enables double the load to be carried in the available space. However, there are a number of disadvantages with this method. In particular it requires use of a forklift (or other lifting device) in the interior of the pan to lift the pallets onto and off of the second floor. This means that a loading bay must be used in order for the forklift to access the interior of the truck both for loading and unloading. There are many situations where a loading dock is not available and therefore the second floor cannot be used.

Another disadvantage is the weight of the second floor adds to the overall tare weight of the vehicle. This could limit the weight of a load to be carried.

A variant on the removable floor solution involves the use of bearers configured to move up and down along fixed vertical tracks on each side of the storage space. In this situation a series of vertically oriented tracks are spaced along opposite sides of the storage space. A bearer can be moved up or down along the track to a position at the required height where it is locked against the track.

A support level can be achieved by moving a second neighbouring bearer along a second track and locking it at the same height. The two bearers can then be used to support a load that spans the horizontal separation of the two bearers. This could either be a large package or a loaded pallet.

This solution is essentially the same as the removable floor, except that support is provided by two or more bearers rather than a solid platform. It therefore suffers from the same disadvantages as the removable floor; in particular this arrangement requires use of a fork lift inside the storage area in order to load and unload the second support level.

Another solution to the problem of providing a second support level is the use of movable bearers. In this instance the upper support level within the storage space consists of a series of bearers, or beams, that span the space from one wall to the opposite wall of the storage space. The ends of the beams are connected to wheels or bearings which are supported by a track which runs horizontally along opposite sides of the storage space at the required height.

Loading of the storage space normally-begins with a first row of pallets being loaded onto the floor against the rear end of the space. A second row of pallets is loaded onto two or more movable bearers at the open end of the storage space. The loaded bearers are then moved into position over the first row of pallets and locked into position on the track. This process of placing a row on the floor followed by a row on the movable bearers above the row on the floor is repeated from the rear of the storage space towards the front until all pallets are loaded or the available space has been used.

The pallets can be loaded onto the movable bearers at the front or open end of the storage space either with the forklift on a raised platform, such as a docking bay, or at ground level. It is not necessary for the forklift to enter the interior of the storage area.

In practice the bearers of the movable bearer system are removed from the track as each row is unloaded, and placed back onto the track for each new load. This is because the bearers for the first row of pallets, being the row situated at the rear end of the storage space, need to be the first bearers on the track.

These first bearers are placed on the track and loaded with a row of pallets. The loaded bearers then pushed into position at the rear of the storage space before the bearers for the next row are loaded onto the track. The process is repeated with each set of loaded bearers being pushed into place before the next set of bearers is placed on the track.

Unloading is the reverse process whereby the pallets from the row closest to the open end of the storage space are removed first and those bearers removed from the rail. The row of pallets from the floor closest to the open end of the storage space is removed to enable access to the second row of pallets on the bearers. The loaded bearers are moved forward to the open end of the storage space where the pallets are removed, followed by removal of that set of bearers. This process is repeated until all the pallets and bearers are removed.

Considerable time and labour is required to remove and replace the bearers on the track as required. In addition, space must be found to store the bearers In instances where the space is to be used without the movable bearer system. Storing the bearers also requires additional time and labour.

The tracks used in the movable bearer systems described above are in the form of "L" shaped brackets attached to the side of the storage space. The wheel attached to the bearer runs along the horizontal section of the track. There is nothing in this basic arrangement to prevent the bearer from skewing sideways causing the wheel to leave the track, thus spilling any load from the bearer.

This problem is mitigated by the use of a wide horizontal section of the track onto which a cylindrical rod has been attached. The wheels attached to the beaters have a rim which is curved to fit over and around the upper surface of the cylindrical rod. The wheel moves along the cylindrical rod on the horizontal section of the track. This arrangement restricts the ability of the bearer to skew on the track.

However, with the bearers removed following unloading, the wide tracks protrude into the storage space to such an extent that they can limit the options for stacking a load when the bearer system is not in use.

This is also a problem when the space is being used for a mixed load where only part of the space is being used with the bearer system.

Furthermore, the horizontal ledge of the track which protrudes into the storage space presents a safety hazard for workers in the area.

For these reasons the track has to be removed and stored as well as the bearers whenever the bearer system is not in use.

On the occasions when the movable bearers are not required the bearers (and attached wheels) and the tracks are commonly stored outside of the storage area. In the case of a truck or trailer this is usually under the floor or tray of the truck or trailer.

The time and labour required to assemble the movable bearer system for use, and to disassemble and store it when not required is a major disadvantage with the system.

Thus there are significant disadvantages with both the removable second floor and the movable bearer system as means of providing additional support surfaces which limit the usefulness of both systems.

It is an object of the present invention to address the forgoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

SUMMARY

According to one aspect of the present invention there is provided a bearer system for supporting a removable load including
a bearer, and
two or more movable bearer supports attached to the bearer
characterised in that the bearer system includes an enclosed track configured to retain each of the movable bearer supports and to allow the movable bearer supports to be moved in a substantially horizontal plane and wherein at least one part of the track is attached to a substantially vertical supporting structure.

According to another aspect of the invention there is provided a method for installing a bearer system for supporting a removable load, the bearer system including a bearer, at least two movable bearer supports attached to the bearer, and a track
including the steps of
  a) attaching the track to a supporting structure, and
  b) locating the movable bearer supports on the track
wherein the track is configured to enclose and retain the movable bearer supports and to allow the movable bearer supports to be moved in a substantially horizontal plane and wherein at least one part of the track is attached to a substantially vertical section of the supporting structure.

Reference to a bearer throughout this specification should be understood to refer to a beam used to provide support for a load. Support may be provided by a single bearer from which a load is hung, for example a carcass hung below a bearer. In general however a bearer is used to support a load placed onto it.

A bearer system is any system in which one or more bearers are used to provide support. A bearer system may be used to provide support for goods during storage or transport.

A bearer system commonly uses two or more bearers to form a support surface onto which a load can be placed. Such bearer systems differ from a floor or other solid base, such as the base of a drawer, in that there is a space between the two or more bearers used to support the load.

An advantage of the bearer system over the removable floor of the prior art is that the bearer system, being made from spaced beams rather that a solid platform (which generally will include beams as a structural framework for the floor), may be lighter than the removable floor.

For fixed bearers the base of the load placed on the bearers must be large enough to span the gap between neighbouring bearers. In other instances the spacing of the bearers may be adjusted so that the spacing between neighbouring bearers is less than a dimension of the load placed onto them.

In a preferred embodiment the bearer includes a spacer bar.

The spacer bar may be pivotally attached to a bearer so that the spacer bar can be rotated in the plane of the surface to which it is attached from a first position aligned along the surface of the bearer to a second position at right angles to the bearer.

In the second position the end of the spacer bar distal to the pivot attachment may be releasably attached to a second bearer. In this way the space between bearers, and particularly neighbouring bearers, can be held constant.

In a preferred embodiment the spacer bar is configured to releasably attach to a second bearer at a range of positions along its length. In this way the distance between neighbouring bearers can be adjusted to accommodate different sized loads.

The removable load may be in the form of a package large enough to be supported by a pair of neighbouring bearers, or as one or more packages stacked on a pallet.

Reference to a pallet throughout this specification should be understood to refer to a portable platform on which goods can be moved, stacked, and stored.

Pallets are commonly used to hold goods for storage or transport. Pallets used commercially are typically around 1 m wide by 1.2 m long. Therefore the bearers in a bearer system designed to support a pallet will generally be separated by less than a meter. In this way the pallets can be loaded onto the bearer system in either orientation.

The weight of a loaded pallet obviously depends on the weight of the goods loaded onto it. However, weights up to around 800 kg are not unusual. More than two bearers may be needed to support a heavy load, depending on the load bearing properties of the bearers.

The bearer system of the present invention includes one or more bearers and two or more movable bearer supports. Reference to a movable bearer support throughout this specification should be understood to mean an object that is configured to attach to a bearer and which supports the bearer and enables the bearer to be moved.

The benefit of a movable bearer is that a load can be placed on a bearer in one location within the storage space and the bearer and load subsequently moved to another location within the storage space for storage or unloading.

In a preferred embodiment the movable bearer support includes a wheel. The wheel assembly typically includes an axle and a bearing which enables the wheel to be turned. A movable bearer support could include more than one wheel, for example to reduce the weight bearing on each axle or to provide additional stability.

Reference will be made throughout this specification to a movable bearer support including a wheel. However those skilled in the art will appreciate that there are other configurations which would enable the bearer to be moved, and that reference to a wheel only in this specification should not be seen as limiting.

For example, the movable bearer support could be configured to include a roller, roller bearing, ball bearing, a sliding mechanism or any other device that facilitates the movement of the movable bearer support along a surface.

In the bearer system of the present invention a movable bearer support is attached to each end of each bearer.

The bearer system includes a track. Reference to a track throughout this specification should be understood to refer to a bearing surface, strip or rail, or a pair of parallel strips or rails, along which something can be moved. For clarity, when a track is formed by a pair of substantially parallel rails, reference to an enclosed track configured to retain the movable bearer supports should be understood to mean that each rail is configured to retain one of the movable bearer supports.

In practice a bearer and the movable bearer supports attached to each end of the bearer span the distance between a pair of parallel rails that form the track, such that the wheel on each side of the bearer is located on the track. In this way the bearer can be moved along the track as required.

In a preferred embodiment the movable bearer support includes a locking mechanism.

Reference to a locking mechanism throughout this specification should be understood to refer to any mechanism on a movable bearer support configured to releasably hold the movable bearer support in a fixed position on a track.

A simple locking mechanism could consist of a pin attached to the movable bearer support, the pin being configured to engage in a locked position with a hole in the track, thus preventing the movable bearer support from moving along the track. The movable bearer support may be moved by removing the pin from the hole in the track and retaining the pin in an unlocked position.

In other embodiments the locking device may be configured to include a ratchet mechanism which allows motion in one direction, typically towards a closed end of the storage area, whilst preventing motion in the other direction unless disengaged.

These examples of simple mechanisms are provided for illustration of the concept only. Those skilled in the art would appreciate that there are a number of methods for locking such systems onto a track and reference to pins or ratchet devices should not be considered as limiting.

In a preferred embodiment the track is attached to a supporting structure. Reference throughout this specification to a supporting structure should be understood to refer to any rigid structural member capable of supporting the bearer system.

Examples of supporting structures include, but are not limited to, a wall, a roof or a floor of a storage space, or a frame member of a structure, for example a cross member of a shelving structure such as may be found in a warehouse.

A supporting structure according to the present invention includes a substantially vertical section onto which at least a part of the track is attached.

The track, typically a pair of spaced apart rails, is oriented on the supporting structure such that it (the track and each rail) lies in a substantially horizontal plane.

Reference to a substantially horizontal plane throughout this specification should be understood to mean a plane that is oriented within 45° of the horizontal plane.

In a preferred embodiment the track is attached to a wall. In other words, at least one side of the track (one rail) is attached to a wall. Although in most preferred embodiments each rail forming the track is attached to a wall, other configurations are possible, for example one side attached to a wall and the other side on a supporting structure in the form of a frame supporting the track.

However, those skilled in the art would appreciate that the track may be attached to any rigid structural member and that reference throughout this specification to a track attached to a wall should not in any way be considered as limiting.

Attaching the track to the wall enables the height of the support surface to be adjusted as required.

In many instances the bearer system may be used to provide a support surface that spans the space between two walls. In such cases a track is attached to each of the two opposite walls such that the tracks lie in a substantially horizontal plane at the required height. The dimensions of the bearer and attached movable bearer supports are chosen so that the wheels of the movable bearer supports sit on the tracks.

In a preferred embodiment the track is attached to a wall of an enclosed storage space.

Reference to an enclosed storage space throughout this specification should be understood to refer to a storage space where access to the space is limited, typically to one end of the space.

Common examples of enclosed storage spaces include the storage space on trucks and trailers used for haulage (where there is no access to the sides of the storage space on the truck or trailer), trucks with refrigeration units and containers as used for shipping and road transport.

Another example is the stacking space in a warehouse where the space extends away from an aisle but where access to the side of the space is not possible.

In each of these examples access to the storage space is limited to an opening at one end of the space.

The advantage of attaching the track in a substantially horizontal plane to a wall of an enclosed storage space is that the bearers can be loaded sequentially at the opening and moved to the back of the space, or moved from the rear of the space to the opening for unloading. The bearer system provides an additional support surface above the floor of the storage space, potentially doubling the storage area while retaining reasonable access.

In a preferred embodiment the enclosed storage space is a pan on a truck or trailer. Reference to a pan throughout this specification should be understood to refer to the enclosed storage space on a truck or trailer unit. Those skilled in the art will recognise that the invention may be applied to other enclosed storage spaces and that reference to a pan only throughout this specification should not be seen as limiting.

The pan of a truck or trailer consists of an enclosed storage space having a floor, three sides and a roof. The fourth side contains an opening for access into the storage area. This side, normally the rear end of the pan on the truck or trailer, is typically sealed when required by a door or doors.

Pans vary in size, but typically are sufficiently wide to accommodate two pallets side by side and high enough to accommodate two layers of loaded pallets, one on the floor and one on the bearer system.

The bearer system of the current invention is further characterised in that the track is enclosed in order to retain the movable bearer supports. Reference to an enclosed track throughout this specification should be understood to mean a track configured to retain a movable bearer support within the enclosed track and to allow the movable bearer support to move along the track. In other words, an enclosed track may generally be configured to limit movement of a movable bearer support in all directions apart from movement along the track.

In a preferred embodiment the track is configured to enclose the wheel of the movable bearer support such that the wheel is retained inside the track. The enclosed track serves as a guide for the wheel and hence for movement of the bearer.

An advantage of enclosing the wheel inside the track is that it may prevent the wheel, and therefore the bearer and any load, from leaving the track.

Use of an enclosed track that retains the wheel of the movable bearing support, essentially locking it into the track, means that a thinner wheel and therefore a narrower track can be used than in the prior art system. The arrangement used to control and retain the wheel in the prior art movable bearer system required a track with a wide ledge to accommodate the cylindrical rod running down its length. The rim of the wheel of the prior art bearers is curved to engage and be guided by the cylindrical rod. The diameter of the cylinder and hence the size of the wheel had to be sufficiently large to provide stability to the system, particularly in order to cope with heavy loads.

The enclosed track of the current invention provides retention and guidance of the wheel by holding it within the track at all times. The larger track and wheel system of the prior art is therefore no longer required, as a narrower wheel within an enclosed track can be used.

The narrower track may not protrude into the storage space to the same extent as the "L" shaped bracket track of the prior art. In most instances the narrower track may be left in place without limiting the stacking options when the bearing system is not in use.

Furthermore, the enclosed track does not have a ledge protruding into the storage area, as in the case of the "L" shaped track of the prior art, and therefore is less of a safety hazard.

The use of an enclosed track in the current invention overcomes the limitation of the prior art movable bearer system in that the track may be left in place when the bearers are not being used without limiting the available space for storage or providing a safety hazard. This saves time and labour (and hence cost), which are important factors in the commercial environment.

In one embodiment of the present invention the enclosed track is recessed into the supporting structure. Recessing the track into the supporting structure further reduces the protrusion of the track into the storage space.

In a preferred embodiment the track is recessed into the supporting structure such that no part of the track protrudes out of the supporting structure and into the storage space.

Recessing the enclosed track into the supporting structure may provide greater stability than a track attached to the side of a supporting structure. Recessing the track may also increase the load handling capacity of the track and bearer system by providing support directly under and across the enclosed track, particularly when the entire track is recessed into the supporting structure.

When the entire track is recessed the load from the bearer system may be supported directly under the track (vertical loading) by the section of substantially vertical supporting structure into which the track is recessed. In contrast, with the track cantilevered off the side of a wall, as in some prior art arrangements, the load on the track causes a bending moment against the wall. This bending moment can cause large stresses on the wall/track and can lead to the track breaking away from the wall under load, or indeed the wall (supporting structure) failing.

A recessed track configuration significantly reduces the bending stress applied to the side of the supporting structure in comparison with a track attached to the outside of the supporting structure. This may be of considerable importance when the supporting structure is (for other operational reasons) constrained in its construction, as is common with the wall of a pan of a truck or trailer. In this instance, recessing the track into the wall of the pan may significantly reduce the structural impact of the bearer system.

A bearing system according to the present invention having a track recessed into the wall of a pan may provide a safe and practical solution to creating additional storage space inside a pan (for example) while avoiding many of the problems associated with prior art bearer systems.

In another embodiment the track may be a recess in the supporting structure. In this embodiment the supporting structure may be a solid metal framework which has been configured to provide an enclosed track.

The bearer system of the present invention overcomes the disadvantages of the removable floor (and the bearers on fixed vertical tracks) by providing a means to move the bearers substantially horizontally along the enclosed storage space. This allows goods to be loaded (or unloaded) at the open end of an enclosed storage space and moved into position inside the storage space. Loading and unloading does not require a forklift inside the enclosed space as in the case of the removable floor and for bearers on fixed vertical tracks.

The use of an enclosed track, for example a track recessed into the support structure, also reduces or removes the protrusion of the track into the storage space. The shape of the enclosed track does not present any sharp edges and so is less of a safety hazard than the ledge of the "L" shaped track of the prior art. As a result the track can be fitted and left in place, unlike the track of the prior art moving bearer system where the track has to be removed whenever the bearer system is not in use.

According to another aspect of the invention there is provided a bearer storage system for storage of bearers in the bearer system substantially as described above, including a bearer storage track configured to receive a bearer and attached movable bearer supports from the bearer system characterised in that the bearer storage track is configured to enclose and retain each movable bearer support placed on the bearer storage track and to enable the bearer to be moved from an in-use position to an out-of-use position.

According to another aspect of the invention there is provided a method for installing a bearer storage system for storing bearers in the bearer system substantially as described above, the bearer storage system having a bearer storage track configured to receive a bearer and attached movable bearer supports from the bearer system
including the step of
attaching the bearer storage track to a support structure, wherein the bearer storage track is configured to enclose and retain the movable bearer supports and to enable the bearer to be moved from an in-use position into an out-of-use position.

In a preferred embodiment the bearer storage track is configured to enclose and retain the movable bearer support. Use of an enclosed track may prevent the moving bearer support from accidentally leaving the track. This may be a considerable advantage when moving bearers along curved tracks or in particular when the orientation of the bearer is changed, for example through 180° into an "up-side-down" position.

Reference to an in-use position throughout this specification should be understood to mean the position defined by two or more bearers when the bearers are providing a support surface.

In a preferred embodiment the in-use position is a position of a bearer when engaged with the enclosed track of a bearer system substantially as described above, i.e. substantially on the enclosed track in a substantially horizontal plane.

Similarly, reference throughout this specification to an out-of-use position should be understood to refer to a position where the bearer is not required to provide a support surface.

In a preferred embodiment the bearer storage track is configured to enable the bearer to be moved from a substantially horizontal in-use position through a non-horizontal position into an out-of-use position.

In the example of the bearer system described above the out-of-use position is any position of the bearer after it is removed from the enclosed track of the bearer system.

There is a need to remove the bearers from an in-use position into an out-of-use position whenever additional space is required to accommodate a load to be placed into the storage space. Typically this will be for a load which is too large, or in particular too high, to fit in the storage space with the bearer system in place.

In a preferred embodiment the out-of-use position is a storage position.

A storage position is understood to be any position where the bearers can be stored when not in use.

The storage position may be any position where the bearers can be stored without interfering with the space required for storage of the load. This could be any suitable storage position outside of the enclosed storage space.

However there is an advantage for the out-of-use storage position to be close to the in-use position as this reduces the time and effort required to transfer the bearers from one position to the other.

In a preferred embodiment the bearer storage system is installed in an enclosed storage space including a bearer system.

In a preferred embodiment, the out-of-use position will be within the enclosed storage space. This provides the advantage of keeping the bearers within the enclosed storage space at all times, thus reducing the effort required to move them between the in-use position in the storage space and the out-of-use position.

In a preferred embodiment the out-of-use position is at the top of the storage space.

Reference throughout this specification to the top of the storage space should be understood to refer to a position in the storage space above the space required for storage of a load.

The top of an enclosed storage space may be a position in the vicinity of the roof or ceiling of the enclosed storage space.

In a preferred embodiment the bearer storage system is connected to the bearer system. The connection is formed by a junction between the enclosed track of the bearer system to the bearer storage track.

The junction between the bearer storage track and the enclosed track of the bearer system allows the bearers to be transferred from one track to the other while at all times being supported and guided by one or other of the tracks.

This is a major advantage over the prior art systems where the bearers are physically removed from the track as required for loading or unloading and storage of the bearers. These operations require hard physical labour to lift and move the bearers, as well as being time consuming. The connection of the two tracks in the present invention overcomes this disadvantage of the prior art system.

In a preferred embodiment the junction between the bearer storage track and the enclosed track of the bearer system is configured such that a bearer can be moved in any direction along either track as required.

In a preferred embodiment of the present invention the junction between the bearer storage track and the enclosed track of the bearer system is located part way along the enclosed track of the bearer system.

The junction is configured as above such that a bearer can be moved in any direction along either of the tracks. Hence, for example, a bearer can be moved from the bearer storage track onto the enclosed track of the bearer system and then moved to any position along the enclosed track of the bearer system on either side of the junction, and in particular to either end of the enclosed track of the bearer system. In this manner the full length of the enclosed track of the bearer system (ie, typically the entire length of the storage space) is available to a bearer.

In a preferred arrangement the junction between the enclosed track of the bearer system and the bearer storage track is located in the vicinity of the open end of the storage space. With this arrangement the bearers can be moved to and from the bearer storage track as required by an operator at the open end of the storage space.

In another embodiment of the present invention the junction between the bearer storage track and the enclosed track of the bearer system is at an end of the enclosed track of the bearer system. For example, the bearer storage track may be a continuation of the enclosed track of the bearer system.

This simple arrangement may be of advantage in circumstances where the enclosed track of the bearer system does not extend the full length of the storage space, i.e. where it is not required that a bearer be located against the open end, or the end opposite the open end, of the storage space.

Preferably the locking device used to lock the bearings onto the enclosed track of the bearer system is also used to lock the bearers onto the bearer storage track in the out-of-use position. This arrangement holds the bearers while in storage. This is a particular advantage for bearer storage system used for storage during transport when the motion of the vehicle could otherwise cause the bearers to move.

In a preferred embodiment the enclosed storage space is the pan of a truck or trailer.

In another embodiment the bearers are stored outside of the storage space.

For example for a bearer system and bearer storage system installed in a truck or trailer, the storage position could be a position in the vicinity of the floor or tray of the truck or trailer. This may be just above, under or on the floor or tray.

In this embodiment the bearer storage track is configured to carry the bearers from the enclosed track of the bearer system to an out-of-use position outside of the storage space.

The use of a bearer storage system as described in the present invention provides a simple apparatus and method for transferring movable bearings from an out-of-use storage position into an in-use position on a bearer system and vice versa as required.

This overcomes the disadvantage of the prior art movable bearer system where each bearer has to be physically removed from the bearer system and moved into a storage position without the aid of a bearer storage track to support and guide the bearers to and from the storage position.

Joining the bearer storage track to the track of a bearer system, as described above, allows the smooth transfer of the bearers from one system to another by retaining the movable bearer support within a track at all times. This is a substantial advantage over the prior art system where the bearers are lifted off the track of the bearer system.

In a preferred embodiment the bearer system and connected bearer storage system are installed inside the same storage space, such as the pan of a truck or trailer. In this arrangement the system is self contained in that the bearers can be moved around the storage space to and from the in-use and out-of-use positions with the bearers always retained by the tracks. This system can be installed and left as a permanent fixture within the storage area, unlike the prior art movable bearer system.

BRIEF DESCRIPTION OF DRAWINGS

Further aspects of the present invention will become apparent from the following description which is given by way of example only and with reference to the accompanying drawings in which.

DETAILED DESCRIPTION

Figure 1:
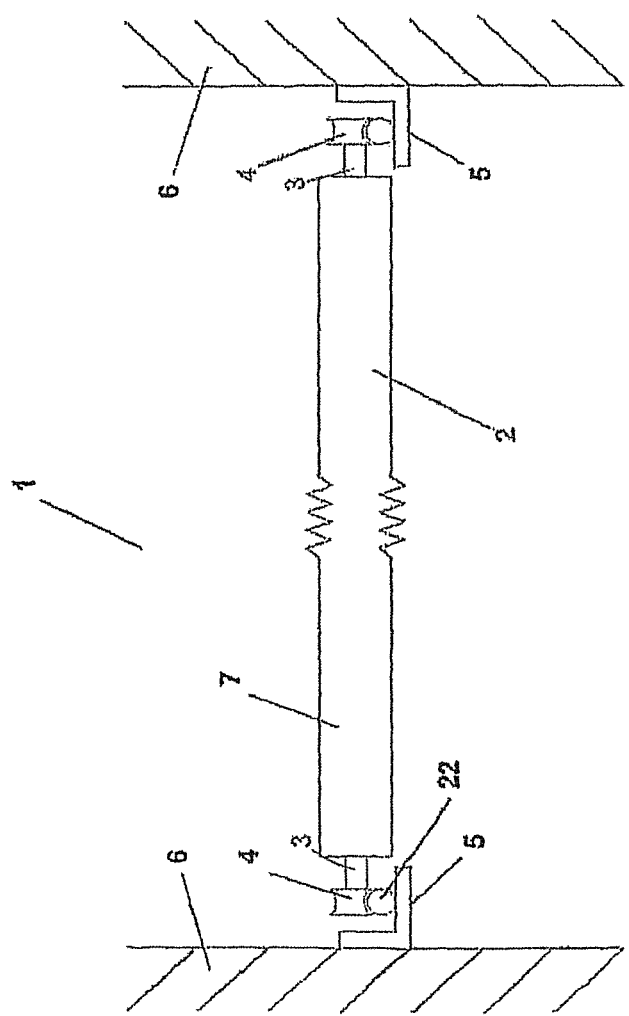
FIG. 1 shows a schematic end on view of a movable bearer system according to one embodiment of the prior art.

FIG. 1 is a schematic representation of a movable bearer system (1) as described in the prior art. Each end of the bearer system (2) is attached to an axle (3) connected to a wheel (4). The wheels (4) are supported on an "L"-shaped track (5) attached to a support structure (6). The rim of the wheel (4) and the cylindrical guide (22) attached to the horizontal section of the track (5) are of a width necessary to restrict the tendency for wheel (4) to fall off the track (5).

A load (not shown), such as a loaded pallet, may be placed on the upper surface (7) of the bearer (2). In general the load will be placed on the upper surface (7) of a pair of neighbouring bearers (2) located on the tracks (5). The plane defined by the upper surface (7) of neighbouring bearers (2) is the in-use plane.

The wheels (4) enable the bearer (2) to be moved along the track (5) as required.

Figure 2:
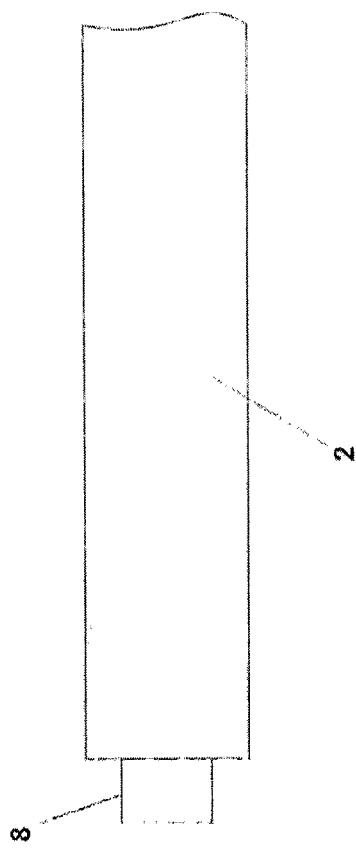
FIG. 2 depicts an end of a movable bearer system according to one embodiment of the present invention.

FIG. 2 shows an end section of a bearer (2) attached to a movable bearer support (8) according to the present invention. The movable bearer support (8) is configured to engage with a track (not shown) so that the bearer and movable bearer support can be moved along the track.

Figure 3:
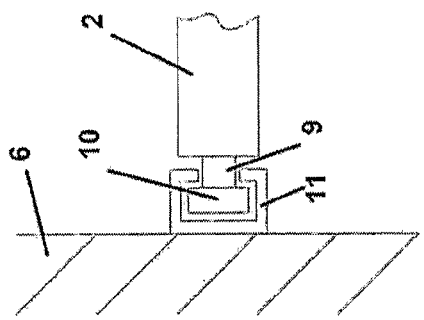
FIG. 3 shows an end of a movable bearer system according to one embodiment of the present invention.

FIG. 3 shows an end section of a bearer system according to the present invention. A bearer (2) is attached to a movable bearer support in the form of an axle (9) and a wheel (10). The wheel (10) is retained inside an enclosed track (11) attached in a substantially horizontal plane to a support structure (6).

The enclosed track (11) is configured to retain the wheel (10) within the track (11) while allowing clearance for the axle (9). The wheel (10) is free to move along the track (11) but has restricted lateral movement due to the configuration of the track (11).

The wheel (10) has a narrower rim than the wheel (4) of the prior art as a result of the wheel (10) being retained within the enclosed track (11). The additional width of the wheel (4) and track (5) of the prior art are no longer necessary to keep the wheel (10) on the track (11).

The width of the enclosed track (11) is also reduced in correspondence with the reduction in the rim size of the wheel (10). This reduction in width means that the enclosed track (11) does not protrude into the storage space to the extent of the track (5) of the prior art.

The configuration of the enclosed track (11), in which the edges nearest to the bearer have been "folded" over in order to enclose the wheel (10), also poses less of a safety hazard than the horizontal section of the track (5) of the prior art.

The reduction in size, together with the safer shape, means that the enclosed track (11) can be left in place without limiting stacking options when the bearer system is no longer required. This is a major advantage over the prior art.

Figure 4:
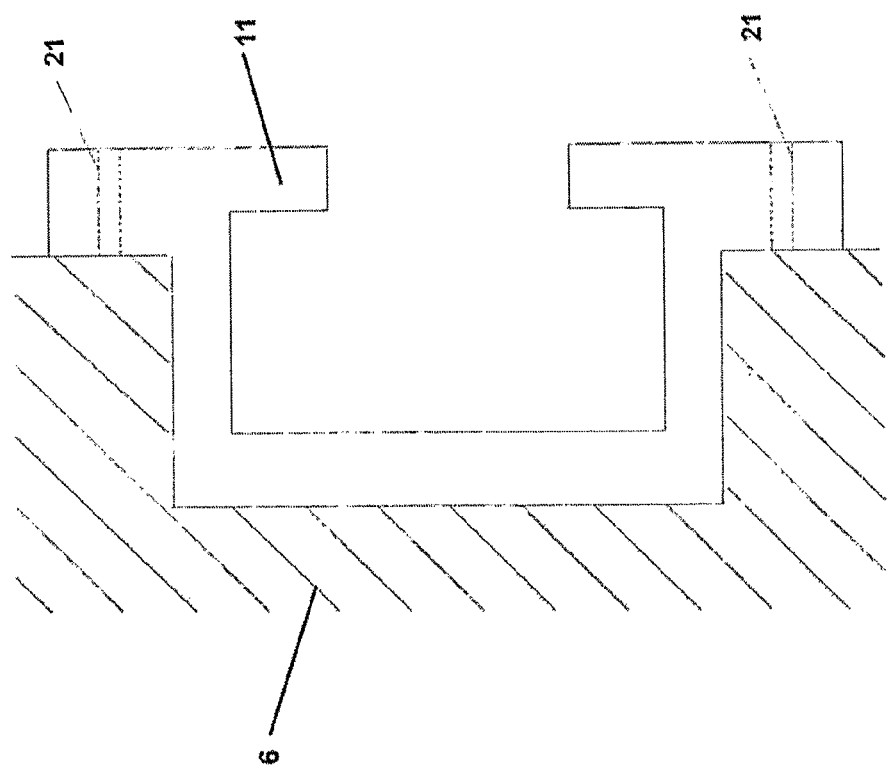
FIG. 4 shows a cross section of an enclosed track recessed in a support structure.

FIG. 4 shows a cross-section through an enclosed track (11) which is recessed into the support structure (6). The track includes flanges configured at locations (21) to enable the track (11) to be attached to the support structure (6).

Recessing the enclosed track (11) into the support structure (6) further reduces the protrusion of the enclosed track (11) into the storage space.

In the preferred arrangement the enclosed track (11) is recessed into the support structure (6) to the extent that no part of the enclosed track (11) protrudes into the storage area at any time.

In each of these arrangements the enclosed track (11), once fitted into the support structure (6), becomes a permanent fixture.

Figure 5:
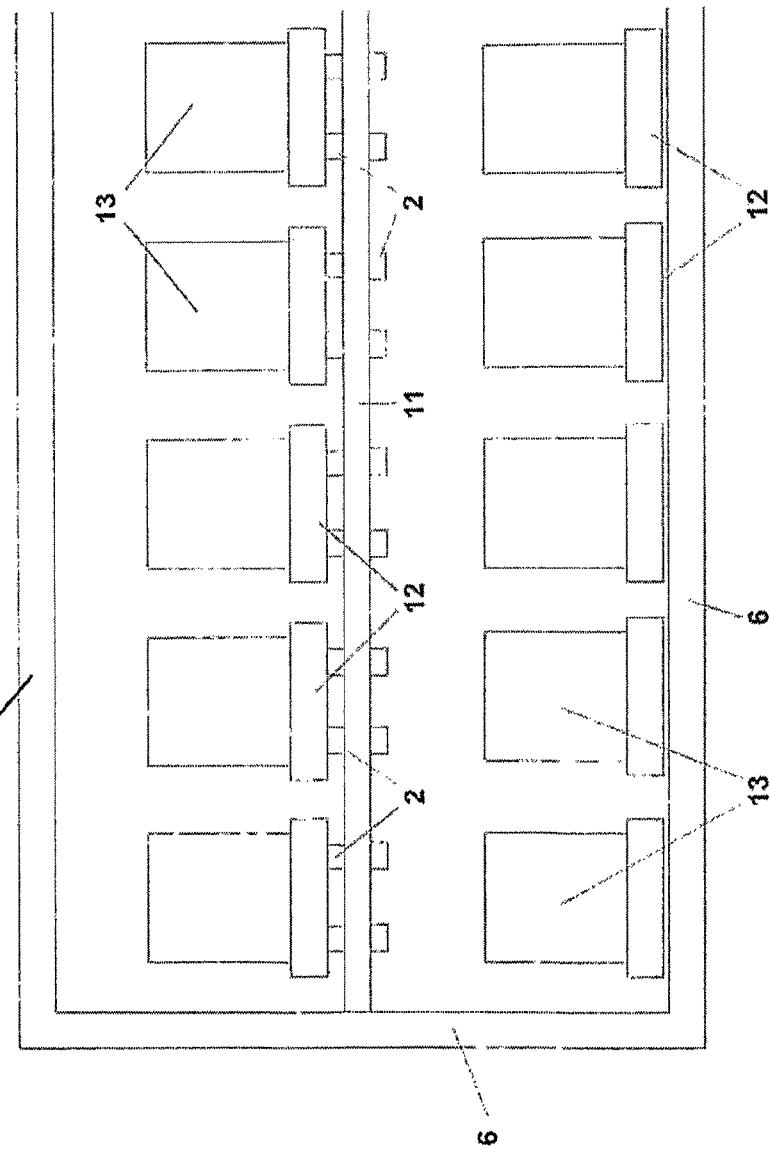
FIG. 5 shows a side view of a stacking arrangement.

FIG. 5 shows a side view of a possible stacking arrangement using the bearer system of the current invention. The storage space is defined as the space within the support structure (6). A series of pallets (12) holding loads (13) are shown schematically arranged on the floor of the storage area. An upper support level is provided by the bearer system of the current invention through bearers (2) supported by a track (11) which is attached to the support structure (attachment not shown) in a substantially horizontal plane. A further series of pallets (12) with their loads (13) is shown stacked on the bearers (2).

During storage or transport the bearers are normally locked into position on the track (11) using a locking mechanism (not shown).

Figure 6:
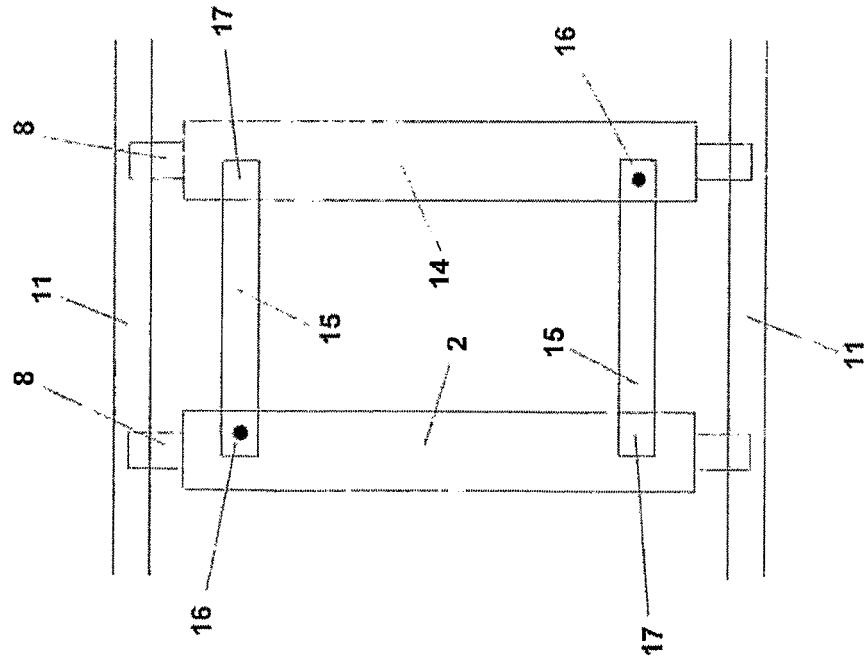
FIG. 6 shows a plan view of a bearer system according to one aspect of the present invention.

FIG. 6 shows a plan view of two neighbouring bearers (2, 14), on a pair of tracks (11), in a situation where a spacer bar (15) is attached to each of the bearers (2, 14) so as to maintain a fixed spacing between them.

In a preferred arrangement the spacer bar (15) is pivotally attached to the bearer (2, 14) at a point (16) so as to allow the spacer bar (15) to be rotated in the plane of the bearers (2, 14) from a first position along the bearer (2, 14) to which it is attached, to a second position at right angles to the bearers (2, 14). In the second position, as shown in FIG. 6, the end (17) of the spacer bar (15) distal to the pivot point (16) is configured to lockably engage with the second bearer (2).

In a further application there is provided a range of points (not shown) along the length of the spacer bar (15) which may be lockably engaged with a second bearer. In this way the separation of neighbouring bearers (2, 14) may be varied.

Figure 7:
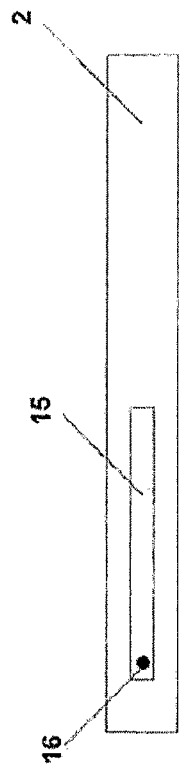
FIG. 7 shows a plan view of a bearer and spacer bar according to one embodiment of the present invention.

FIG. 7 shows a schematic view of a bearer (2) and a spacer bar (15) attached to the bearer (2) at the pivot point (16). The spacer bar (15) in FIG. 7 is shown in the first position which is used whenever the bearers are decoupled, for example when the bearers are in an out-of-use position.

Figure 8:
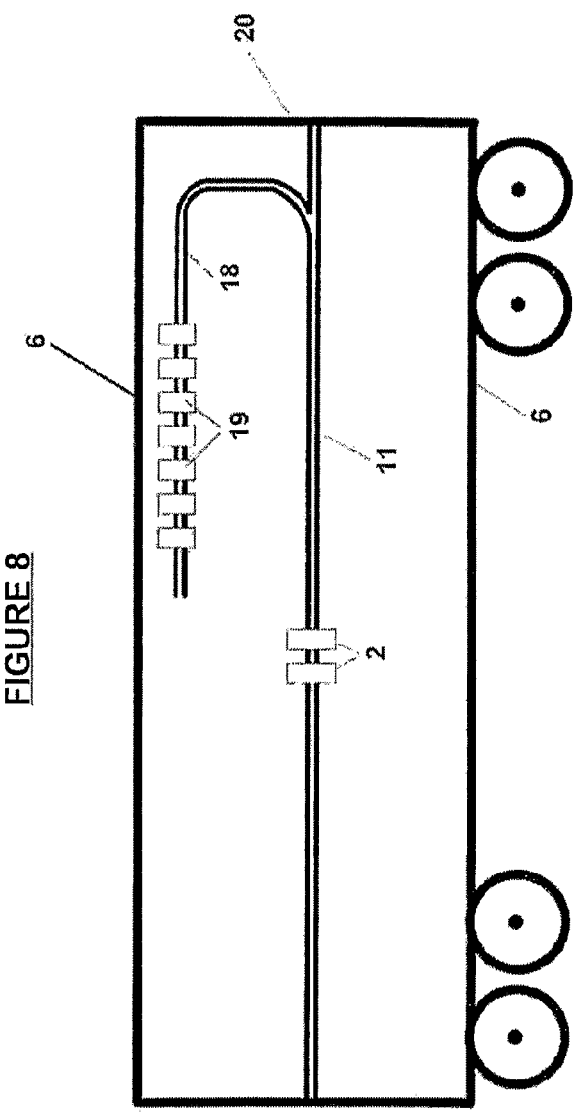
FIG. 8 shows a side view of a bearer system and a bearer storage system according to one embodiment of the present invention.

FIG. 8 shows a side elevation of a bearer system and a bearer storage system installed on the side wall of the pan of a truck or trailer. The bearer system includes a track (11) attached to the wall of the pan in a substantially horizontal plane, and bearers (2) attached to the track (11) with movable bearer supports (not shown). The bearer storage system includes a bearer storage track (18).

The bearer support track (18) is shown in a location close to the roof of the storage space. However it will be appreciated that the bearer storage track (18) may be situated at any place in or about the storage space where the bearers may be conveniently stored so as not to limit the required space within the storage space.

FIG. 8 shows two bearers (2) situated on the track (11) in the in-use position. Also shown are bearers (19) attached to the bearer storage track (18) in an out-of-use position.

Preferably the bearer storage track (18) is configured to enclose the wheels (10) attached to the bearers (2) as in the case of the track (11) used in the bearer system. The use of an enclosed bearer storage track will retain and guide the wheels (10) of the movable bearer supports so that the bearers cannot fall off the bearer storage track (18) and can be safely moved along the bearer storage track (18) into an out-of-use position The bearer storage track (18) is connected to the track (11) at a junction near the open end of the pan (20). This facilitates the transfer of the bearers from the in-use position on track (11) to the out-of-use position on track (18). Placing the junction near the open end of the pan (20) allows the bearers (2, 19) to be transferred from one track to the other as required when loading or unloading.

In operation the bearers (2) can be removed from the in-use position by transferring them from the track (11) to the bearing storage track (18) at the junction.

Figure 9:
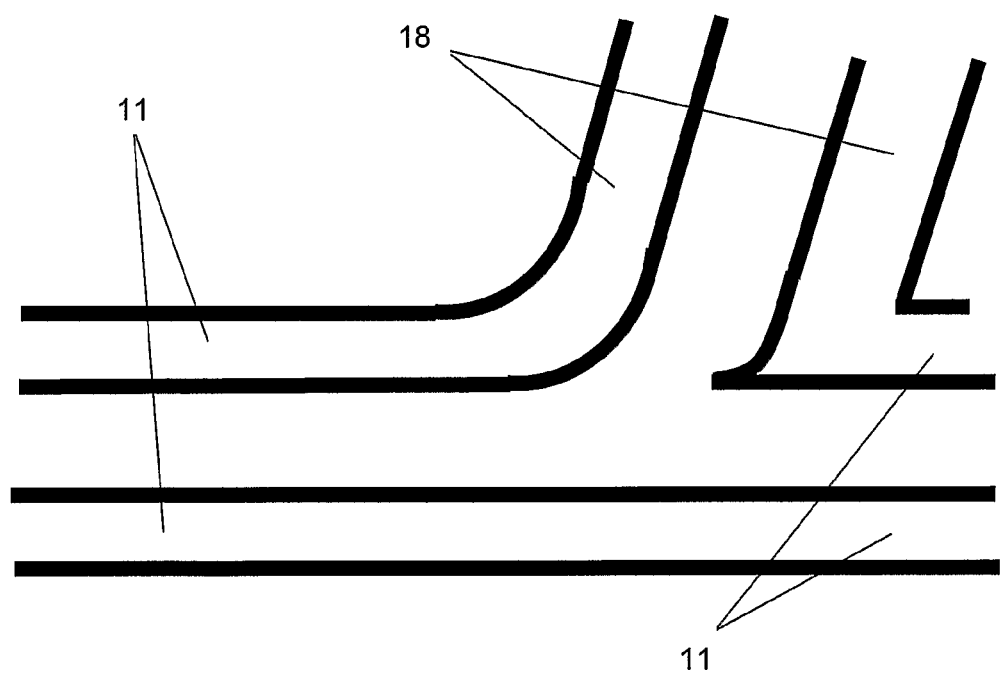
FIG. 9 shows a side view of a join between the tracks of a bearer system and a bearer storage system according to one aspect of the present invention.

FIG. 9 shows a side view of a junction between the enclosed track (11) of the bearer system and the bearer storage track (18), shown as an enclosed track, of the bearer storage system.

With this arrangement a bearer is moved from an out-of-use position along the track (18) until it meets the junction with the track (11) where it may be transferred to the track (11) and moved along track (11) into an in-use position.

Similarly a bearer is removed from the in-use position by moving it along the track (11) to the junction of track (11) with the bearer storage track (18), where it is transferred to the bearer storage track (18) and moved along the bearer storage track (18) into an out-of-use position.

In the connection shown in FIG. 9 the track (11) extends on either side of the junction with the bearer storage track (18). With this arrangement bearers may be moved from an out-of-use position along the bearer storage track (18) onto the track (11) from where they may be moved in either direction along track (11) in order to take advantage of all the available space.

In a preferred arrangement the junction of the track (11) with the bearer storage track (18) is located in the vicinity of the open end of the storage space (20)

Preferably the locking device used to lock the bearings (2) onto the track (11) is also used to lock the bearers (19) onto the bearer storage track (18) in the out-of-use position.

Aspects of the present invention have been described by way of example only and it should be appreciated that modifications and additions may be made thereto without departing from the scope thereof as defined in the appended claims.

What we claimed is:

1. A bearer system for supporting a removable load comprising:
   a bearer, and two or more movable bearer supports attached to the bearer;
   a first enclosed track configured to retain each of the movable bearer supports and to allow the movable bearer supports to be moved in a substantially horizontal plane, and wherein at least part of the track is attached to a substantially vertical supporting structure;
   a bearer storage track configured to enclose and retain each movable bearer support placed on the bearer storage track;
   wherein the first enclosed track has only one single branch channel at a point along the length of the first enclosed track between, and displaced from, first and second ends of the first enclosed track;
   a junction between the bearer storage track and the first enclosed track located at the branch channel, the junction comprising a plurality of sections, comprising at least an acute-angled section into the first enclosed track in which a direction of movement of each movable bearer support is at an acute angle relative to a direction of movement of each moveable bearer support along the first enclosed track; and
   each movable bearer support being freely movable within the first enclosed track and the bearer storage track across the junction.

2. A bearer system as claimed in claim 1, wherein the bearer includes a spacer bar.

3. A bearer system as claimed in claim 2, wherein the spacer bar is configured to releasably attach to a second bearer at a range of positions along a length thereof.

4. A bearer system as claimed in claim 1, wherein each of the movable bearer supports comprise a wheel.

5. A bearer system as claimed in claim 4, wherein the first enclosed track is configured to enclose the wheel of each of the movable bearer supports such that the wheel is retained inside the first enclosed track.

6. A bearer system as claimed in claim 1, wherein at least one of the movable bearer supports comprises a locking mechanism.

7. A bearer system as claimed in claim 1, wherein the first enclosed track is recessed into the supporting structure.

8. A bearer system as claimed in claim 7, wherein the first enclosed track is recessed into the supporting structure such that no part of the first enclosed track protrudes out of the supporting structure and into a storage space.

9. A bearer system as claimed in claim 1, wherein the supporting structure is a wall.

10. A bearer system as claimed in claim 9, wherein the wall is that of an enclosed storage space.

11. A bearer system as claimed in claim 1, wherein the system is installed in an enclosed storage space.

12. A bearer system as claimed in claim 11, wherein the enclosed storage space is a pan of a truck or trailer.

13. A bearer system as claimed in claim 1, wherein each movable bearer support is movable between and an out-of-use position and an in-use position above the out-of-use position.

14. A bearer system as claimed in claim 1, wherein the junction is configured such that the bearer can be moved in any direction along either track as required.

15. A bearer system as claimed in claim 14, wherein the junction is located in the vicinity of an open end of a storage space.

16. A method for installing a bearer system for supporting a removable load, the bearer system including a bearer, at least two movable bearer supports attached to the bearer, a first enclosed track configured to retain each of the movable bearer supports and to allow the movable bearer supports to be moved in a substantially horizontal plane and a bearer storage track configured to enclose and retain each movable bearer support placed on the bearer storage track, the method comprising the steps of:
   attaching the first enclosed track and the bearer storage track to a supporting structure, the first enclosed track having only one single branch channel at a point along the length of the first enclosed track between, and displaced from, first and second ends of the first enclosed track;
   forming a curved junction between the first enclosed track and the bearer storage track, the junction comprising a plurality of sections, comprising at least an acute-angled section into the first enclosed track in which a direction of movement of each movable bearer support is at an acute angle relative to a direction of movement of each moveable bearer support along the first enclosed track, the junction configured to enable each movable bearer support to be freely movable within the first enclosed track and the bearer storage track and freely movable from an in-use position on the first enclosed track to an out-of-use position on the bearer storage track; and
   locating the movable bearer supports on the first enclosed track.

* * * * *